(12) United States Patent
Davis et al.

(10) Patent No.: US 7,872,948 B2
(45) Date of Patent: Jan. 18, 2011

(54) ACOUSTIC WIDE AREA AIR SURVEILLANCE SYSTEM

(75) Inventors: Henry H. Davis, Irvine, CA (US); Kevin Dale Balmforth, Fullerton, CA (US); Richard Ove Nielsen, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 416 days.

(21) Appl. No.: 12/102,272

(22) Filed: Apr. 14, 2008

(65) Prior Publication Data

US 2009/0257314 A1    Oct. 15, 2009

(51) Int. Cl.
G01S 3/802 (2006.01)
G01S 5/22 (2006.01)
G01S 3/808 (2006.01)
G01S 11/14 (2006.01)

(52) U.S. Cl. .................. 367/136; 367/124
(58) Field of Classification Search .............. 367/136, 367/127, 125, 124; 701/207
See application file for complete search history.

(56) References Cited

U.S. PATENT DOCUMENTS

| | | | |
|---|---|---|---|
| 3,412,375 A | 11/1968 | Prehmus | |
| 4,811,308 A | 3/1989 | Michel | |
| 2006/0227664 A1 | 10/2006 | Horak | |
| 2009/0257314 A1* | 10/2009 | Davis et al. | 367/125 |

FOREIGN PATENT DOCUMENTS

| | | | |
|---|---|---|---|
| DE | 4013790 A1 | | 10/1991 |
| FR | 2774474 A1 | | 8/1999 |
| GB | 2196119 A | | 4/1988 |
| GB | 2459185 | * | 10/2009 |
| WO | 2009085345 A1 | | 7/2009 |

* cited by examiner

*Primary Examiner*—Dan Pihulic
(74) *Attorney, Agent, or Firm*—Yee & Associates, P.C.; Charles S. Gumpel

(57) ABSTRACT

A method and apparatus for detecting an aircraft. The method is provided for wide area tracking of aircraft. An acoustic emission of the aircraft is detected from a plurality of locations. A position of the aircraft at a set of times is estimated by comparing a set of harmonically related Doppler shifted frequencies for the acoustic emission to an expected zero Doppler shifted frequency of the aircraft to form an estimated position. The position of the aircraft and a heading of the aircraft are tracked using the estimated position. The aircraft type is classified based on the corresponding set of zero Doppler frequencies at each acoustic sensor.

22 Claims, 10 Drawing Sheets

US 7,872,948 B2

ACOUSTIC WIDE AREA AIR SURVEILLANCE SYSTEM

BACKGROUND INFORMATION

1. Field

The present disclosure relates generally to monitoring systems and in particular to a method and apparatus for surveillance for low flying aircraft. Still more particularly, the present disclosure relates to a method and apparatus for detecting, tracking and classifying aircraft using sound sensors distributed over a wide surface area beneath the surveillance area.

2. Background

An ability to detect and locate low flying aircraft is an important capability for areas where surveillance radars do not exist or are hindered by terrain.

Today air traffic control radar and transponder systems, as well as other radar systems, are used to attempt to track and identify aircraft covertly crossing international borders. While these systems may provide coverage in some areas, in other areas coverage is limited by high terrain or distance from widely spaced radar and transponder facilities. As a result, those surveillance systems are often unreliable for tracking low flying aircraft and for tracking aircraft attempting to evade detection by operating at low altitudes and/or covertly. In addition, monostatic radar may provide unwanted alertment to the aircraft being tracked.

One solution may be to employ numerous radar systems to cover low altitude areas of interest; however, this approach may be expensive and impractical in many areas.

Therefore, it would be advantageous to have a method and apparatus for overcoming the problems described above.

SUMMARY

The present disclosure provides a method and apparatus for detecting an aircraft. In one advantageous embodiment, a method is provided for wide area tracking of aircraft. An acoustic emission of the aircraft is detected from a plurality of locations. A position of the aircraft at a set of times is estimated by comparing a set of harmonically related Doppler shifted frequencies for the acoustic emission to an expected zero Doppler shifted frequency of the aircraft to form an estimated position. The position of the aircraft and a heading of the aircraft are tracked using the estimated position.

In another advantageous embodiment, a method is provided for monitoring an area for an aircraft. A plurality of sound sensors is monitored for an acoustic emission from the aircraft in the area. Responsive to detecting the acoustic emission at a set of sound sensors within the plurality of sound sensors, observed frequencies for the aircraft in the acoustic emission detected by the set of sounds sensors are compared with a set of expected frequencies for the acoustic emission to form a comparison. A position of the aircraft is estimated from the comparison.

In yet another advantageous embodiment, an apparatus comprises a plurality of sound sensors and a data processing system. The plurality of sound sensors is capable of detecting an acoustic emission from an aircraft. The data processing system in is communication with the plurality of sound sensors and is capable of monitoring the plurality of sound sensors for the acoustic emission from the aircraft and estimating a position of the aircraft using sound data for the acoustic emission as detected by a set of sound sensors in the plurality of sound sensors in response to detecting the acoustic emission at the set of sound sensors.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
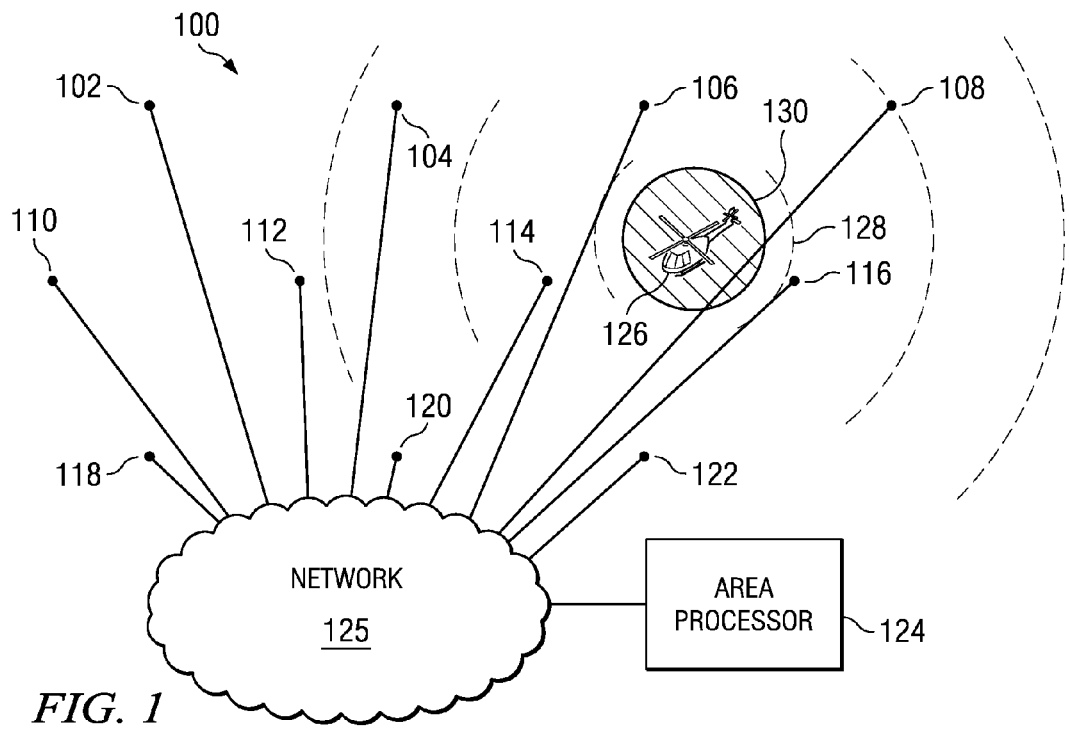
FIG. 1 is an illustration of an acoustic air surveillance system in which an advantageous embodiment may be implemented.

With reference now to the figures and in particular with reference to FIG. 1, an illustration of an acoustic air surveillance system is depicted in accordance with an advantageous embodiment. In this example, acoustic air surveillance system 100 includes sound sensors 102, 104, 106, 108, 110, 112, 114, 116, 118, 120, and 122. Additionally, acoustic air surveillance system 100 also includes area processor 124 that collects and processes the data from the sensors.

These sensors may be, for example, acoustic sensors. One or more of these sound sensors may detect acoustic emission 128 generated by aircraft 126. Acoustic emission 128 is the sound that aircraft 126 generates. From acoustic emission 128, a signature may be identified. Aircraft 126 may generate frequencies within acoustic emission 128 that allow for the identification of aircraft 126. In these examples, acoustic emission 128 is the sound that aircraft 126 generates in flight.

Acoustic air surveillance system 100 may identify a location for aircraft 126 using acoustic emission 128. This identification may be an estimate of aircraft 126 location with area of uncertainty 130. Area of uncertainty 130 is an area in which aircraft 126 is believed to be present.

Sound sensors 102, 104, 106, 108, 110, 112, 114, 116, 118, 120, and 122 may be distributed across a geographic area. These sensors may be located on various natural and manmade features. For example, these sensors may be located on platforms, such as, for example, without limitation, oil rigs, fire towers, cell towers, and other suitable features. The data generated by these sensors may be sent to area processor 124 through network 125.

Network 125 may include a number of different media for transmitting data to area processor 124. This media may include, for example, the internet, wireless transmissions, fiber optic lines, pipeline communication networks, and other wired or wireless medium. Further, network 125 may be, for example, a single network or a combination of different networks. Network 125 may include traditional types of networks, such as, for example, local area networks, wide area networks, the Internet, or other types of networks.

Additionally, network 125 may be implemented using networks based on existing communication lines, such as, for example, telephone lines and/or commercial fiber optics networks. In other advantageous embodiments, network 125 also may employ wireless networks and satellite networks. In other advantageous embodiments, network 125 may transmit information through other media, such as power lines or other suitable media. Network 125 may employ one type of transmission media or multiple types of transmission media depending on the particular implementation.

Acoustic air surveillance system 100 may be able to detect aircraft flying at altitudes below levels detectable by radar systems. In these advantageous embodiments, acoustic air surveillance system 100 may provide coverage for areas in which radar is present and/or radar may be blocked by a high terrain or at distances outside radar coverage. Acoustic air surveillance system 100 may provide an ability to detect aircraft, such as those flying below 1500 feet for level terrain, or below 5000 feet in mountain terrain.

Further, acoustic air surveillance system 100 may be implemented using low cost sensing, processing and communications components to assemble an area surveillance system of lower total cost than the total cost of for radar systems designed to cover the same area. With this type of system, in addition to detecting and tracking aircraft, acoustic emission 128 may provide information needed to identify a type of aircraft as well as other attributes about the aircraft.

The illustration of acoustic air surveillance system 100 is provided for purposes of depicting one manner in which different advantageous embodiments may be implemented. This illustration is not meant to imply architectural limitations as how acoustic air surveillance system 100 may be implemented. For example, multiple area processors may be used to collect and process very widely spaced or distributed fields of sound sensors 102, 104, 106, 108, 110, 112, 114, 116, 118, 120, and 122 in FIG. 1.

As another example, other numbers of sound sensors and other arrangements of sound sensors may be employed. For example, in some advantageous embodiments, only three sound sensors may be employed, while fifty sensors may be employed in others. Further, these sound sensors may be arranged at different spacing or distances away from each other, depending upon acoustic propagation characteristics of differing terrain situations. Further, the different sound sensors illustrated may be of the same type or different types of sound sensors.

The different advantageous embodiments provide a method and apparatus for detecting acoustic emission of an aircraft from a number of different locations. In one embodiment, a position of the aircraft may be estimated at a set of times by comparing a set of harmonically related Doppler shifted frequencies for the acoustic emission. An expected zero Doppler frequency of the aircraft is obtained when the aircraft reaches the closest point of approach to a sound sensor.

An initial estimate of position is formed at each instance that the aircraft reaches the closest point of approach to any sound sensor. In these examples, a set refers to one or more items. For example, a set of times is one or more time. A set of harmonically related Doppler shifted frequencies is one or more harmonically related Doppler shifted frequencies. By identifying estimated positions, the position of the aircraft and the heading of the aircraft may be tracked using the estimated position.

The present disclosure provides a method and apparatus for detecting and tracking aircraft without alertment. Acoustic emissions of the aircraft are passively detected from a plurality of locations. A position of the aircraft at a set of times is estimated by comparing a set of harmonically related Doppler shifted frequencies for the acoustic emission to an expected zero Doppler shifted frequency of the aircraft. The aircraft track is established using the sequence of estimated positions. In these examples, a track is a continuous history of aircraft actual course over ground.

In another advantageous embodiment, a method is provided for passively detecting and localizing an aircraft over a wide surveillance area. A plurality of sound sensors is monitored for an acoustic emission from the aircraft in the area. Responsive to detecting the acoustic emission at a set of sound sensors within the plurality of sound sensors, observed frequencies and amplitudes for the aircraft in the acoustic emission detected by the set of sounds sensors are compared with a set of expected frequencies and amplitudes for the acoustic emission to form a comparison. A position of the aircraft is estimated from the comparison.

A method may be provided by which an aircraft type is identified using a set of sound sensors distributed over a wide area. The aircraft classification method determines acoustic parameters that may be uniquely associated with a specific class of aircraft, and thereby identify the aircraft type.

Figure 2:
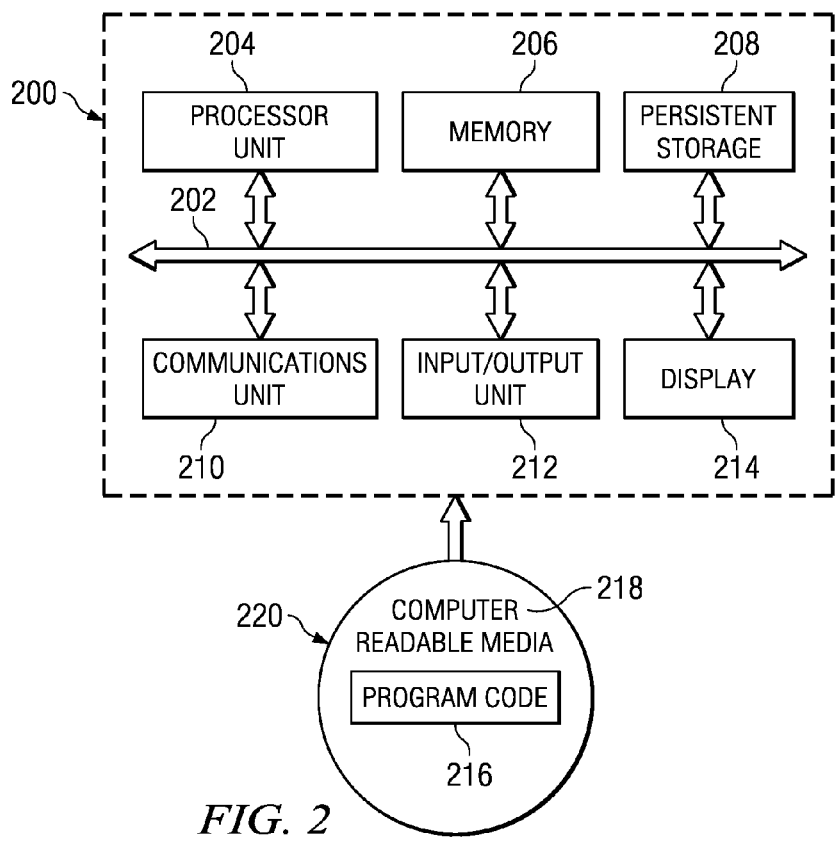
FIG. 2 is a diagram of a data processing system in accordance with an advantageous embodiment.

Turning now to FIG. 2, a diagram of a data processing system is depicted in accordance with an advantageous embodiment. Data processing system 200 is an example of a data processing system that may be used in area processor 124 to process data detected by sound sensors 102, 104, 106, 108, 110, 112, 114, 116, 118, 120, and 122 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis depending upon a variety of possible implementation scenarios. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208.

In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
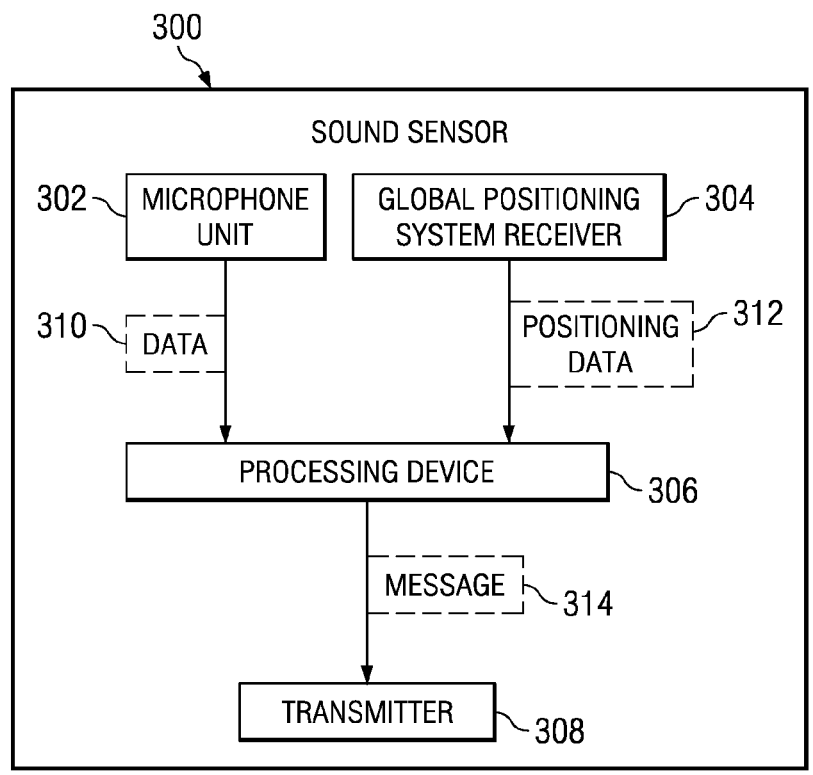
FIG. 3 is a block diagram of a sound sensor in accordance with an advantageous embodiment.

Turning now to FIG. 3, a block diagram of a sound sensor is depicted in accordance with an advantageous embodiment. In this example, sound sensor 300 is an example of a sound sensor, such as, sound sensor 102 or sound sensor 112 in FIG. 1. Sound sensor 300 includes microphone unit 302, global positioning system receiver 304, processing device 306, and transmitter 308.

Microphone unit 302 detects sound within some selected range. Microphone unit 302 may be, for example, a set of omni-directional microphones. Microphone unit 302 may have one or more microphones depending on the particular implementation. Microphone unit 302 generates data 310. This data may include the data for an acoustic emission for an aircraft, as well as possible noise. In these examples, noise is any sound detected that is not generated by an aircraft. In these examples, microphone unit 302 may send data 310 to processing device 306. Data 310 contains the data generated from detecting sounds, such as acoustic emissions from an aircraft.

Global positioning system receiver 304 may provide a location of sound sensor 300. Global positioning system receiver 304 may provide an altitude, as well as longitude and latitude type coordinates to identify the position of sound sensor 300 in three dimensional spaces. This information is sent as positioning data 312 to processing device 306. Global positioning system receiver 304 may provide a time tag or time stamp, which is included with the acoustic data that are sent to processing device 306.

Processing device 306 may provide analog conditioning to separate noise from the desired signal. In these examples, the desired signal is the acoustic emission generated by an aircraft. Further, processing device 306 also may provide analog to digital conversion, as well an ability to generate messages or packets, such as message 314, containing the data for the acoustic emission. This message also may include a time tag or time stamp. The time tag is used for later processing.

Processing device 306 may take various forms. For example, processing device 306 may be an application-specific integrated circuit to perform analog conditioning, analog to digital conversion, and message formation. In other advantageous embodiments, processing device 306 may be a data processing system, such as data processing system 200 in FIG. 2. When processing device 306 is implemented using data processing system 200 in FIG. 2 processing device 306 may perform other types of processing and analysis of information detected by microphone unit 302. For example, without limitation, this additional processing may include determining whether the data includes an acoustic emission from an aircraft. Additional processing may include, for example, without limitation, removing noise from data 310 to leave only the acoustic emission from the aircraft.

Transmitter 308 may transmit message 314 to a processing center, such as area processor 124 in FIG. 1. Transmitter 308 may use various transmission mechanisms, depending on the particular implementation. For example, transmitter 308 may be a wireless transmitter, a network card, a modem, or some other suitable transmission device.

Figure 4:
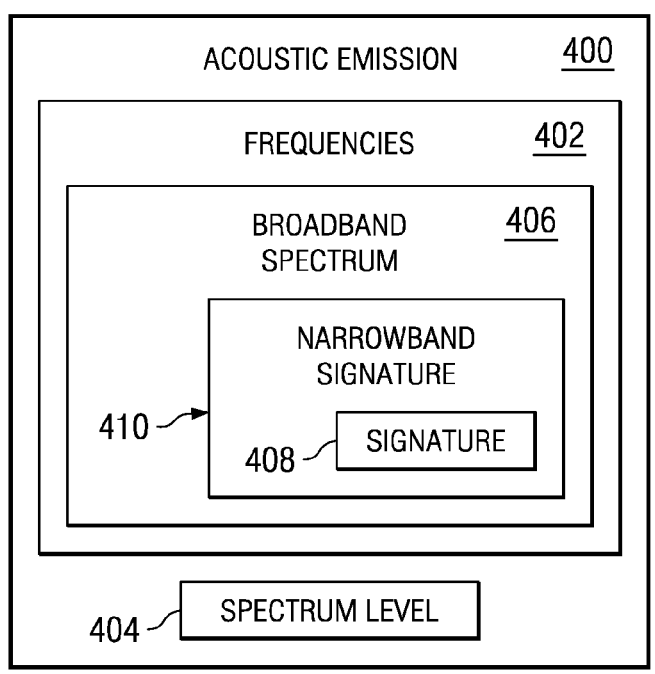
FIG. 4 is a diagram illustrating an acoustic emission in accordance with an advantageous embodiment.

With reference now to FIG. 4, a diagram illustrating an acoustic emission is depicted in accordance with an advantageous embodiment. In this example, acoustic emission 400 is the sound generated by an aircraft. This acoustic emission may include frequencies 402 and spectrum level 404. Frequencies 402 are the different frequencies contained in the sound generated by the aircraft that forms acoustic emission 400. Spectrum level 404 is the amplitude of frequencies 402. Spectrum level 404 may include amplitude for each frequency. In other words, spectrum level 404 is the "loudness" of acoustic emission 400.

Frequencies 402 in acoustic emission 400 form broadband spectrum 406. Broadband spectrum 406 is the entire range of frequencies contained in acoustic emission 400. A broadband spectrum is the total bandwidth of sound frequencies detected by a detection system in these examples. For example, broadband spectrum 406 is the portion of frequencies 402 detected by a microphone or other type of sound sensor. A broadband spectrum may be, for example, tens to hundredths of Hertz. In other words, broadband spectrum 406 may be only a portion of frequencies 402 for acoustic emission 400.

Signature 408 contains frequencies within broadband spectrum 406 that may be used to identify an aircraft from acoustic emission 400. In some advantageous embodiments, signature 408 may encompass all frequencies within broadband spectrum 406. In the illustrative embodiments, signature 408 may be a subset of broadband spectrum 406. In these examples, this subset also is narrowband signature 410.

Narrowband signature 410 is a selected number or subset of frequencies from broadband spectrum 406. For example, narrowband signature 410 may be the frequencies identified for the propeller(s) and/or exhaust of the aircraft generating acoustic emission 400. This narrowband signature may be used to classify or identify various parameters about the aircraft generating acoustic emission 400.

In these examples, the narrowband spectrum in narrowband signature 410 may be used to classify the aircraft. The narrowband spectrum is a subset of the total bandwidth of the detection system. Within a narrowband spectrum, each band is a subdivision containing a portion of the spectrum. For example, a narrowband may have a width of one Hertz or less. In other words, a band within the narrowband spectrum may be analogous to a musical note, while a broadband spectrum may comprise multiple contiguous musical notes. The narrowband spectrum is a subset of the total bandwidth that is present, and the subset may or may not be contiguous frequencies.

In these examples, narrowband signature 410 may be a shifted and/or un-shifted set of frequencies within broadband spectrum 406. These signatures may be shifted because of a Doppler effect. This effect results in a change in frequency as perceived by the sound sensor when the aircraft moves relative to the sound sensor. The received frequency increases as the aircraft moves toward the sound sensor and decreases when the aircraft moves away from the sound sensor. At the instant when the aircraft is at the closest point of approach to a sound sensor, the relative aircraft velocity is zero and the acoustic frequencies received at the sound sensor have zero Doppler shift. The closest point of approach, in these examples, is the minimum distance that occurs between the aircraft and the sound sensor. Frequencies with zero Doppler shift are alternately termed as un-shifted frequencies.

Thus, when the aircraft is at the closest point of approach to a sound sensor, narrowband signature frequencies 410 received by the sound sensor are identical to the narrowband signature frequencies radiated by the aircraft. These observed zero Doppler or un-shifted frequencies provide a common acoustic characterization of the aircraft that may be associated with that aircraft at every sound sensor in the system.

Figure 5:
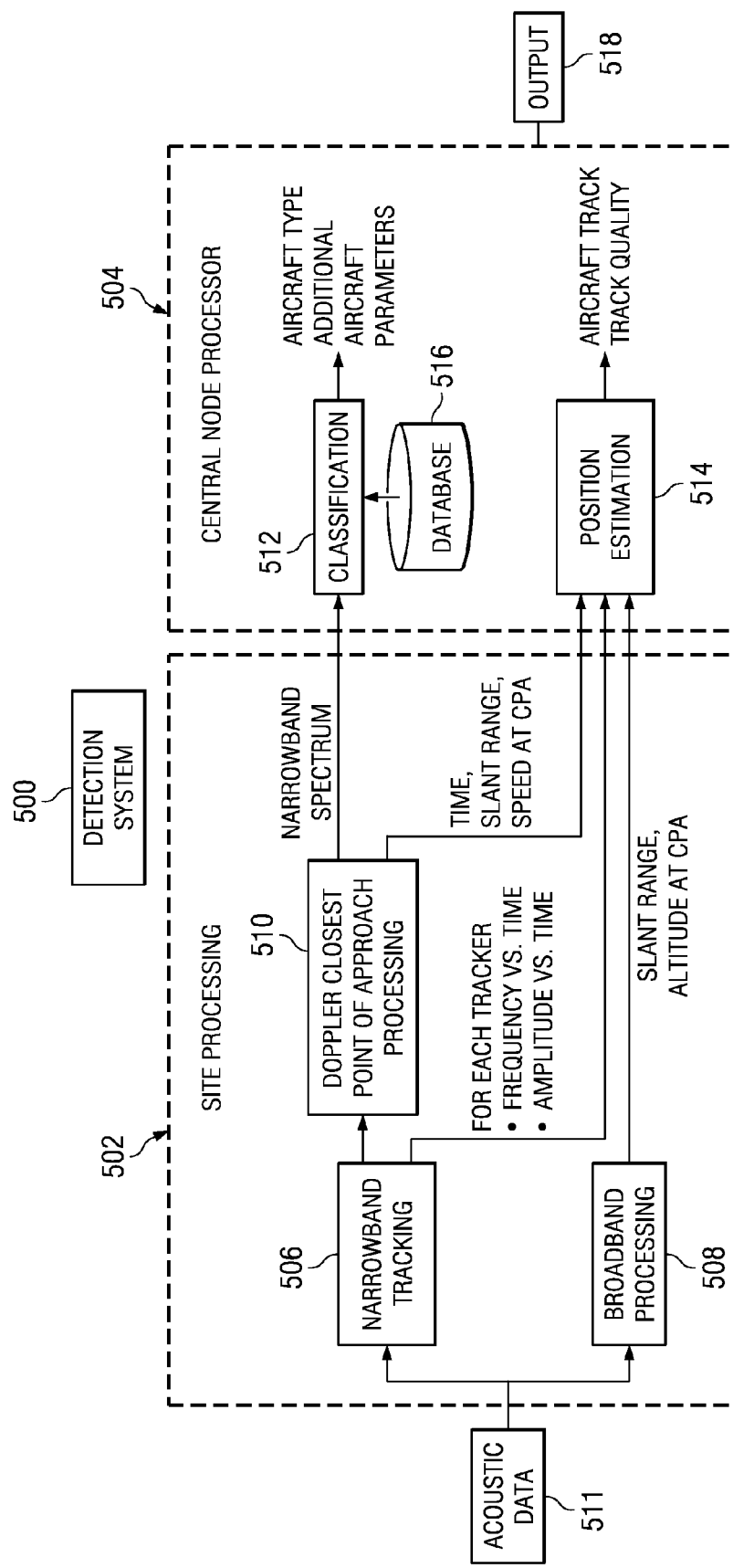
FIG. 5 is a block diagram of functional components used to detect an aircraft in accordance with an advantageous embodiment.

With reference now to FIG. 5 a block diagram of functional components used to detect an aircraft is depicted in accordance with an advantageous embodiment. In this example, detection system 500 is an example of functional components that may be implemented in acoustic air surveillance system 100 in FIG. 1. In these examples, the different functional components include site processing 502 and central node processor 504. Site processing 502 processes data from a sound sensor. As illustrated, site processing 502 comprises narrowband tracking 506, broadband processing 508, and Doppler closest point of approach processing 510. This type of processing may be performed at a central node, such as area processor 124 in FIG. 1. Alternatively, this type of processing may be performed at different sound sensors with the results being transmitted to area processor 124 in FIG. 1.

Identification processes and may be implemented in an area processor. Both area processor 124 in FIG. 1 and central node processor 504 include classification 512 and position estimation 514. These processes are used to identify aircraft from acoustic emissions that may be received in acoustic data 511. In these examples, acoustic data 511 is in a digital form. This classification may occur in different ways. For example, the classification may occur once, for example, without limitation, the first time acoustic data 511 is received for an aircraft. In other embodiments, the classification may be performed sequentially. In other words, classification 512 may classify the aircraft each time a sound sensor detects an acoustic emission and sends acoustic data 511.

In operation, site processing 502 receives acoustic data 511 from a sound sensor. Acoustic data 511 contains an acoustic emission, such as, acoustic emission 400 in FIG. 4. Acoustic data 511 is processed by narrowband tracking 506 and broadband processing 508.

Narrowband tracking 506 processes the narrowband portion of the acoustic emission in acoustic data 511. This narrowband portion may be, for example, narrowband signature 410 in FIG. 4. This component identifies the narrowband signature for the acoustic emission in these examples. The signature may be shifted and unshifted, depending on where the acoustic emission was detected. Narrowband tracking 506 processes acoustic data 511 by assigning a frequency tracker to each discernable frequency line.

In these examples, a Fast Fourier Transform (FFT) is performed on acoustic data 511. Thus, the aircraft emission is decomposed into its spectral components. A detection of an aircraft is declared or indicated if the magnitude of a Fast Fourier Transform frequency bin is larger by some factor than the adjacent bins. The adjacent bins are assumed to contain only noise, in these illustrative examples. A Kalman filter may be assigned to this frequency bin. The Kalman filter is the frequency tracker in these examples.

Thus, as long as sufficient signal-to-noise ratio is present, the Kalman filter follows changes in frequency due to changes in the geometry between the aircraft and the sound sensor. A Kalman filter is assigned to each component of the narrowband spectrum of the aircraft. Thus, narrowband tracking identifies the frequencies in the acoustic emission. In these examples, a "frequency line" refers to a "frequency component" of the narrowband signature.

Narrowband tracking 506 generates data associated with trackers. Each tracker is associated with a frequency versus time and amplitude versus time. In other words, each frequency and amplitude is associated with a particular time. This time may be obtained from time stamps located in acoustic data 511. This output is sent to Doppler closest point of approach processing 510 and position estimation 514. Broadband processing 508 processes acoustic data 511 to identify a slant range and altitude at the closest point of approach. This information is sent to position estimation 514.

In these examples, Doppler closest point of approach processing 510 processes the output from narrowband tracking 506 using the set of time-frequency points that correspond to the change in frequency from high-Doppler (that is, the aircraft is approaching the sensor) to low-Doppler (that is, the aircraft is flying away from the sensor). This set of time-frequency points is provided by the Kalman filter tracker assigned by narrowband tracking 506 in these examples. By examining the shape of the time-frequency curve through closest point of approach, Doppler closest point of approach processing 510 provides estimates of time at the closest point of approach, as well as slant range and speed.

Doppler closest point of approach processing 510 generates a narrowband spectrum, which is sent to classification 512. This narrowband spectrum may be a narrowband signature for the detected aircraft.

Further, Doppler closest point of approach processing 510 also generates time, slant range, and speed at the closest point of approach. In these examples, the closest point of approach is the point at which the aircraft is closest to the sound sensor in these examples. This information is sent to position estimation 514.

Classification 512 may receive this data for a set of one or more sound sensors to identify the aircraft type, as well as other aircraft parameters. These other parameters include, for example, a type of engine in the aircraft, a number of blades in a propeller, a number of propellers, whether the aircraft is a fixed wing aircraft, whether the aircraft is a helicopter, a number of engines in the aircraft, and other suitable parameters. In these examples, classification 512 may identify these parameters using database 516. Database 516, may be, for example, a database of narrowband signatures for known aircraft.

Position estimation 514 receives the processed information for a set of sound sensors. This information may be used to estimate the location of the aircraft. The size of the area of uncertainty may vary depending on the number of sound sensors from which data is received. For example, the area of uncertainty is greater when acoustic data 511 is received from a single sensor as opposed to when acoustic data 511 is received from three sound sensors.

In these advantageous embodiments, it is desirable to receive data from at least three sound sensors for performing estimation of positions. Position estimation 514 may output aircraft track quality. In the illustrative examples, aircraft track quality is a measure of the area of uncertainty in the estimated aircraft position at a given time The position and tracking data is then provided as output 518 to a storage device connected to the internet for access by tactical plotting and intelligence analysis systems located remotely from area processor 124 in FIG. 1 or in central node processor 504

Figure 6:
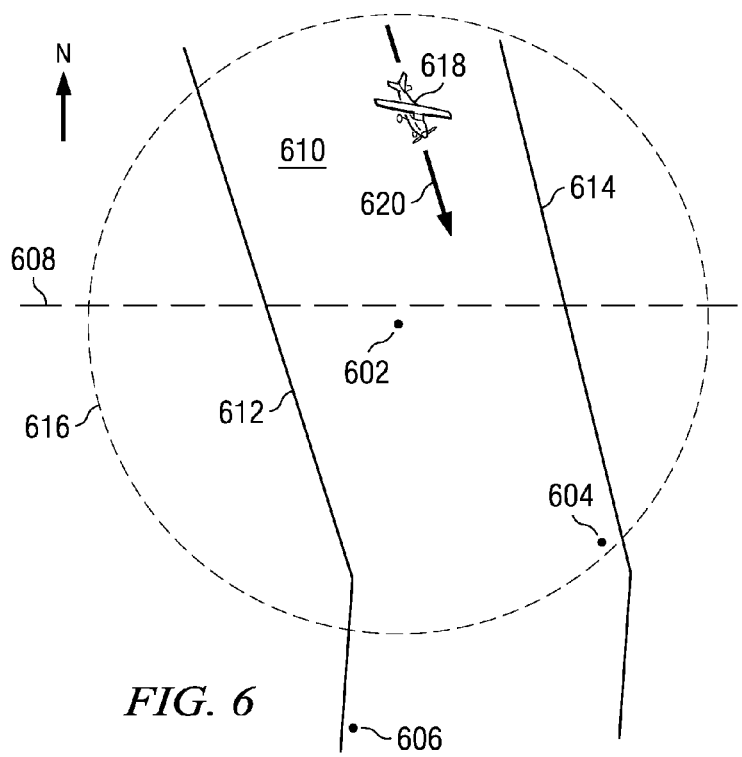
FIGS. 6-10 are diagrams illustrating the detection of an aircraft in accordance with an advantageous embodiment.

With reference now to FIGS. 6-10, diagrams illustrating the detection of an aircraft are depicted in accordance with an advantageous embodiment. In FIG. 6, sound sensors 602, 604, and 606 are sound sensors that may be found within an acoustic air surveillance system, such as acoustic air surveillance system 100 in FIG. 1. These sound sensors may be implemented using a sound sensor, such as sound sensor 300 in FIG. 3.

In this example, sound sensors 602, 604, and 606 are located south of border 608. Border 608 may be a border between countries, states, counties, or some other geographic area. In these examples, these sound sensors are located within valley 610, which has western edge 612 and eastern edge 614.

Each of these sound sensors may have a detection range of around 6 miles to around 8 miles. For example, sound sensor 602 may detect sound within an area defined by circle 616. Sound sensors 604 and 606 may have similar ranges. These ranges and the position of the different sound sensors may result in an overlap in which acoustic emissions may be detected by all three sound sensors within some selected area.

As depicted, aircraft 618 travels in a direction of arrow 620 and may be detected by sound sensor 602. This detection may be made using narrowband processing. In other words, a portion of the sound detected by sound sensor 602 may be used to determine whether an aircraft, such as aircraft 618, has been detected. In these examples, the portion of the sound is a narrowband portion of the broadband spectrum. The narrowband portion may be compared to continuous measurements of ambient noise and to known narrowband spectrums of aircraft to determine whether aircraft 618 has been detected by sensor 602.

Further, data from sound sensor 602 also may be used to track aircraft 618. This tracking may include, for example, determining whether aircraft 618 is approaching sound sensor 602. This tracking may be performed by identifying changes in narrowband spectrum components over different time periods. In these examples, the changes are changes in the amplitude for the different narrowband components.

In addition, with the data obtained through sound sensor 602, a classification of aircraft 618 also may be made. In these examples, the data is a signature from the acoustic emission generated by aircraft 618. In these examples, the acoustic emission generated by aircraft 618 may include a Doppler shifted narrowband signature that reveals a relationship among propeller frequency lines and exhaust frequency lines. In these examples, the frequency lines are the different frequencies that may be present when a propeller and/or exhaust generate sound.

The signature identified from acoustic conditions of aircraft 618 may be compared with a database to identify aircraft 618 based on the sound components generated by the propeller and the exhaust of the aircraft. In this manner, the acoustic emission detected by sound sensor 602 may be used to identify an estimate of speed and heading of aircraft 618, as well as identifying a Doppler shifted narrowband signature for aircraft 618.

Figure 7:
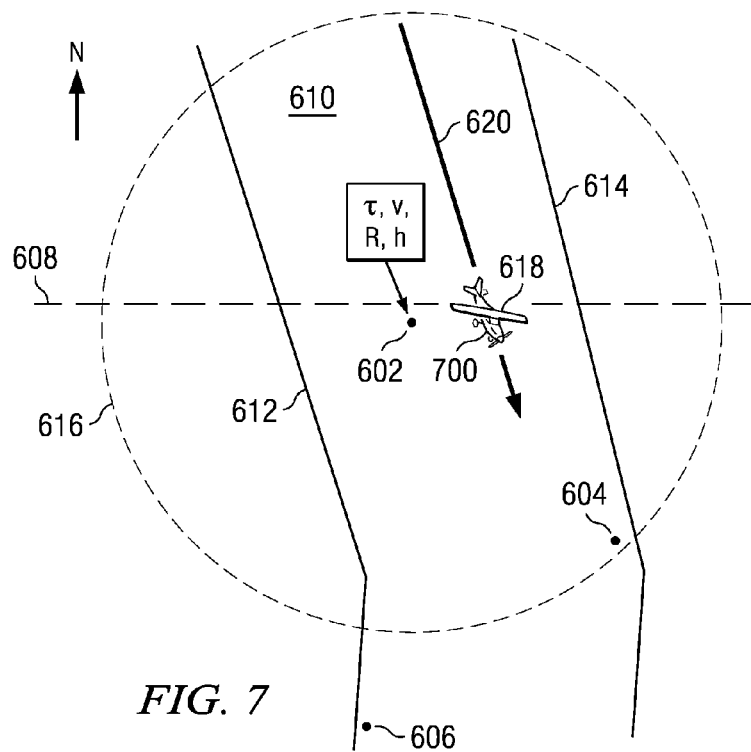

In FIG. 7, aircraft 618 has crossed border 608 and is located at position 700. At this point, various flight parameters may be estimated for aircraft 618. These parameters include, for example, time (t) at closest point of approach; speed (v) at closest point of approach; slant range (R) at closest point of approach; and altitude (h) at closest point of approach, if a broadband interference pattern is present.

Microphone unit 302 in FIG. 3 is positioned a known distance above the ground. The acoustic emission from the aircraft arrives along two paths, in these examples. These paths include, for example, a direct path, which is from the aircraft to the microphone. Another path is a bounce path, which may be from the aircraft to the ground and then to the microphone. These two paths create an interference pattern in the frequency domain. Slant range and altitude at the closest point of approach can be extracted from the spacing in frequency of the peaks and nulls of this interference pattern.

At the time of closest point of approach, an un-shifted narrowband spectrum may be identified for aircraft 618. This un-shifted narrow band spectrum is also referred to as a zero Doppler shifted frequency spectrum. In other words, each frequency within this spectrum is an un-shifted or zero Doppler shifted frequency in which Doppler effects may not be present. This information may provide an identification of sound frequencies for the propeller and engine exhaust.

With narrowband processing, techniques such as fast Fourier transforms may create data for use in identifying an aircraft. For example, the sound for a propeller frequency line and an exhaust line may be used to identify the type of engine. For example, a jet engine has a wider spectrum with less discrete lines as opposed to a propeller engine. In the different illustrative examples, the Doppler-shifted spectrum is examined only before the aircraft has passed the first sensor. After that time, an unshifted spectrum is obtained and the shifted version does not need to be analyzed.

When Doppler shift is not present, the type of aircraft may be determined from these spectrums. For example, light fixed wing, helicopter, engine-propeller configurations, and perhaps even as specific as Cessna 206, Robinson or other type aircraft may be identified.

Also, other information about the aircraft may be inferred. For example, an identification of a reduction gear ratio between the engine and propeller may be used to identify the operating mode of the aircraft. For example, the aircraft may be identified as cruising, orbiting, maneuvering to land, taking off, or performing some other operation.

At this point, flight parameters at the first point of approach for sound sensor 602 may be generated as well as the narrowband signature from the acoustic emission of aircraft 618.

Figure 8:
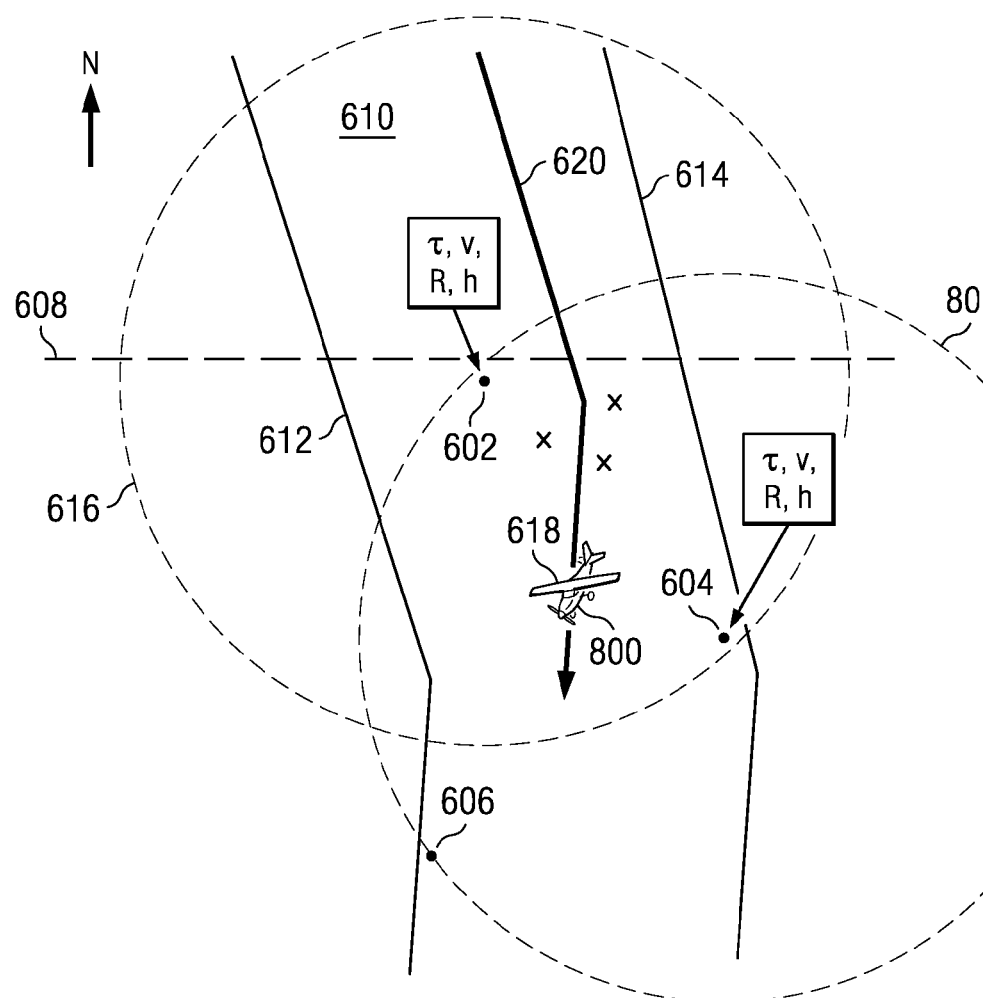

With reference now to FIG. 8, aircraft 618 has traveled to point 800 and may be detected by both sound sensor 602 and sound sensor 604. In these examples, the narrowband signature identified for aircraft 618 is shifted because aircraft 618 is moving towards sound sensor 604 along the direction of arrow 620. The area in which sound sensor 604 detects sound is defined by circle 802 in these examples.

At this time, estimates of aircraft position may be calculated for aircraft 618 based on frequencies detected at sound sensor 602 and sound sensor 604. This estimate of aircraft position also may be based on relative spectrum levels detected by sound sensors 602 and 604. Estimates of aircraft position are denoted by "X's" in FIGS. 8-10. Further, flight parameters also may be estimated as aircraft 618 passes sound sensor 604. These are parameters based on the closest point of approach to sound sensor 604.

Additionally, classification of aircraft 618 may be made using un-shifted narrowband spectrum data from both sound sensor 602 and sound sensor 604. Un-shifted narrowband spectrum data is a signature without a Doppler shift. In the different advantageous embodiments, a classification can be made each time the aircraft passes through the closest point of approach for a sensor.

At this time, estimates of aircraft position versus time may be provided, as well as flight parameters generated by sound sensor 604. These flight parameters may be the same flight parameters generated by sound sensor 602.

Figure 9:
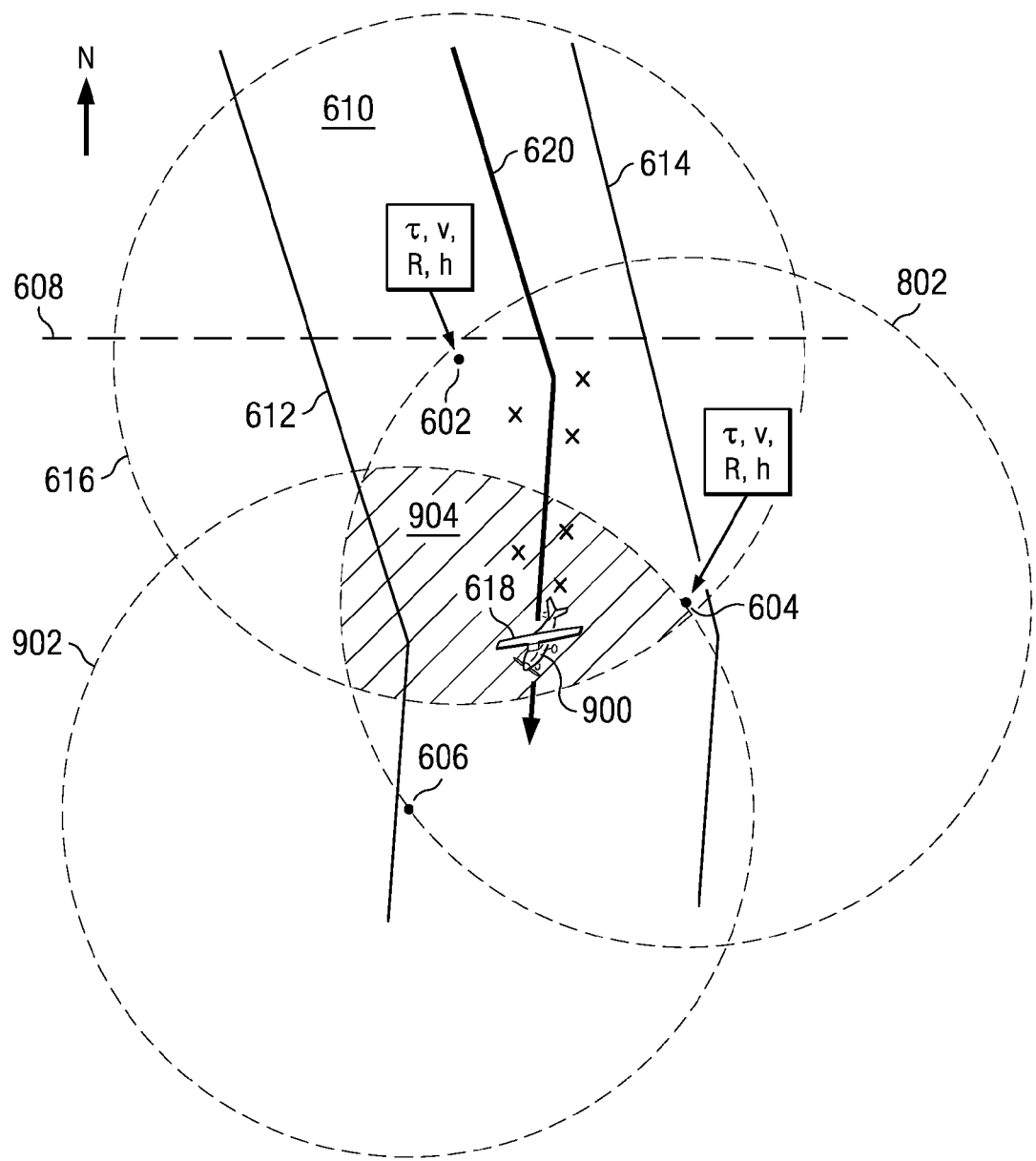

In FIG. 9, aircraft 618 is located at position 900 within valley 610. In this example, sound sensors 602, 604, and 606 all have detected aircraft 618 at point 900. This may be seen from the area in which the different sound sensors detect sound as shown by circles 616, 802, and 902. In these examples, an overlap in detection areas is shown in section 904.

With data being generated from all three sound sensor locations, improved estimates of the position of aircraft 618 may be made. These calculations may be made based on relative frequencies detected by sound sensors 602, 604, and 606.

In these examples, expected frequencies for the aircraft may be compared to actually detected frequencies by these sound sensors to identify a position of aircraft 618. The estimates of aircraft position also may be made based on the relative spectrum levels detected by sound sensors 602, 604, and 606. The un-shifted narrowband provides data about the aircraft for classification purposes.

At this time, improved estimates of aircraft position versus time may be made, as well as having the narrowband signature for aircraft 618. These improvements come from having additional data from sound sensor 606.

Figure 10:
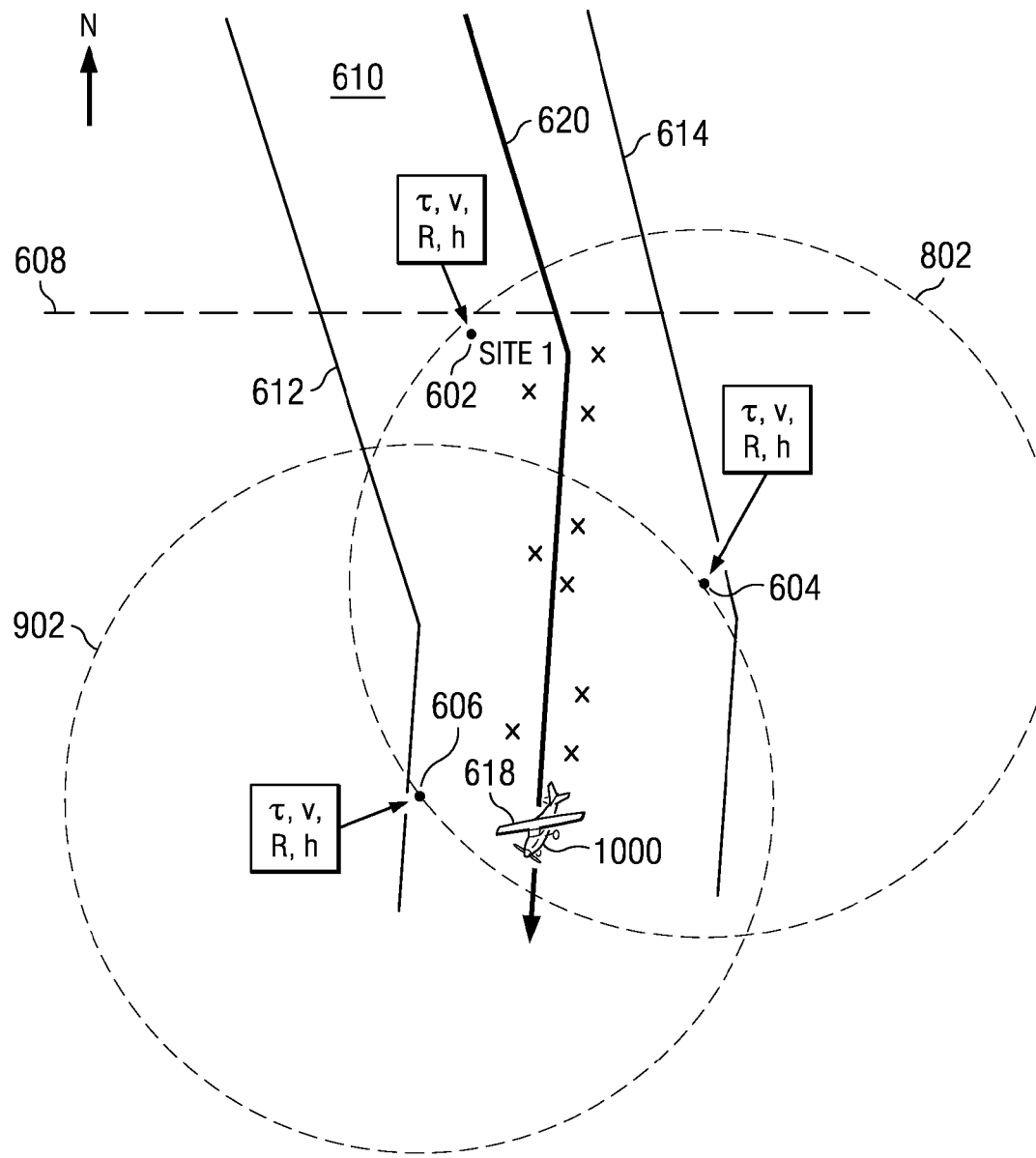

In FIG. 10, aircraft 618 is at position 1000 within valley 610. Aircraft 618 is no longer detected by sound sensor 602, but is detected by sound sensors 604 and 606. At this time, the estimates of aircraft position are based on the relative frequencies of the spectrum levels only from sound sensors 604 and 606. Flight parameters may then be estimated as aircraft 618 passes sound sensor 606.

The example illustrated in FIGS. 6-10 are provided for purposes of illustrating one manner in which an acoustic air surveillance system may operate. In other examples, other numbers of sound sensors may process acoustic emissions generated by an aircraft. For example, in other embodiments, four or ten microphones may process information to detect, track, and/or classify an aircraft. Further, different sound sensors may be employed with different ranges. Also, multiple aircraft can be tracked simultaneously in the different advantageous embodiments.

Figure 11:
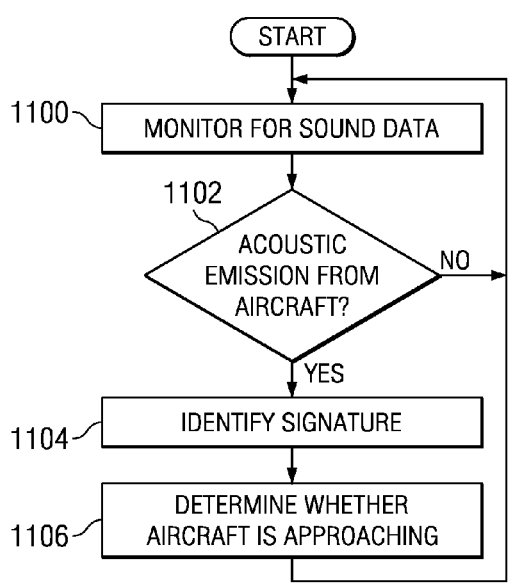
FIG. 11 is a flowchart of a process for processing sound data in accordance with an advantageous embodiment.

With reference now to FIG. 11, a flowchart of a process for processing sound data is depicted in accordance with an advantageous embodiment. The process illustrated in FIG. 11 may be implemented to process sound detected by a single sound sensor within an acoustic air surveillance system, such as acoustic air surveillance system 100 in FIG. 1. In these examples, this processing may be performed as part of site processing 502 in FIG. 5.

The process begins by monitoring for sound data (operation 1100). This sound data may be, for example, acoustic data 511 in FIG. 5. A determination is made as to whether an acoustic emission from an aircraft has been detected (operation 1102). If an acoustic emission has not been detected, the process returns to operation 1100.

Otherwise, the process identifies a signature from the acoustic emission (operation 1104). In operation 1104, the signature may be a narrowband signature in these examples. This signature also may be shifted or un-shifted depending on the location of the aircraft relative to the sound sensor.

The process determines whether or not the aircraft is approaching (operation 1106). The process then returns to operation 1100.

Figure 12:
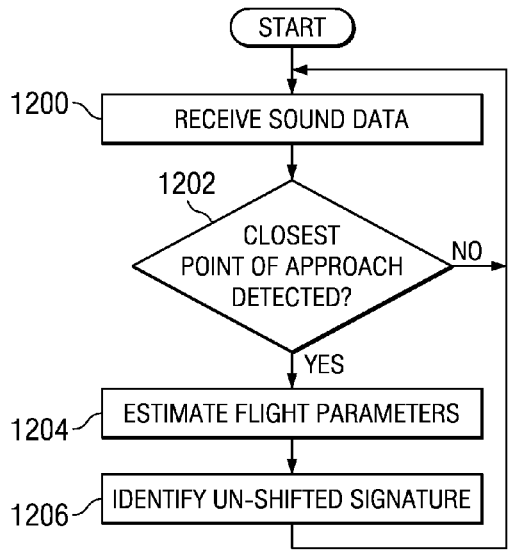
FIG. 12 is a flowchart of a process for processing sound data when an aircraft reaches the closest point of approach in accordance with an advantageous embodiment.

With reference now to FIG. 12, a flowchart of a process for processing sound data when an aircraft reaches the closest point of approach is depicted in accordance with an advantageous embodiment. The process illustrated in this figure may be implemented in Doppler closest point of approach processing 510 in FIG. 5. The process begins by receiving sound data (operation 1200). In these examples, this sound data may be partially processed by a component, such as narrowband tracking 506 in FIG. 5. The process determines whether the closest point of approach has been detected (operation 1202). If the closest point of approach has not been detected, the process returns to operation 1200.

When the closest point of approach is detected for the aircraft, the flight parameters are estimated for the aircraft (operation 1204). Further, an un-shifted signature also is identified for the aircraft (operation 1206). The process then returns to operation 1200 as described above. In these examples, the un-shifted signature is a narrowband signature. In particular, this narrowband signature may include a spectrum or set of frequencies for propeller harmonics and/or engine exhaust harmonics.

In these examples, the flight parameters are estimated as an aircraft passes the sound sensor. These flight parameters include, for example, time, speed, and slant range at the closest point of approach. Altitude at the closest point of approach is determined using broadband processing 503 in FIG. 5.

Figure 13:
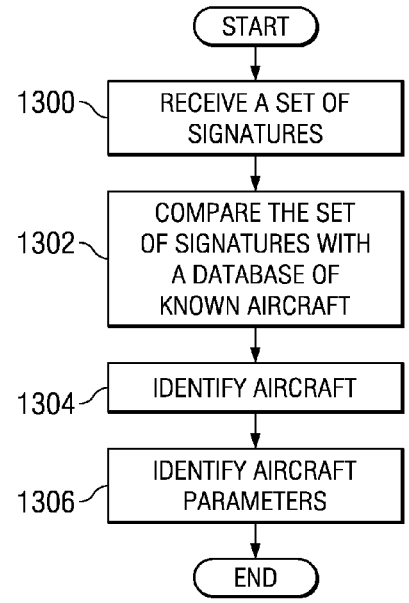
FIG. 13 is a flowchart of a process for classifying aircraft from sound data in accordance with an advantageous embodiment.

With reference now to FIG. 13, a flowchart of a process for classifying aircraft from sound data is depicted in accordance with an advantageous embodiment. The process illustrated in FIG. 13 may be implemented in a component, such as classification 512 in FIG. 5.

The process begins by receiving a set of signatures (operation 1300). In this example, the set of signatures may be one or more signatures generated by Doppler closest point of approach processing 510 in FIG. 5 for a set of sound sensors. In these examples, the signatures are narrowband signatures obtained from a narrowband spectrum in the sound detected by the sound sensors. The process compares the set of signatures with a database of known aircraft (operation 1302).

The process then generates an identification of the aircraft (operation 1304). This identification may be, in some cases, an unknown identification if the set of signatures do not match any of the signatures in the database. The process also may identify aircraft parameters (operation 1306), with the process terminating thereafter. These aircraft parameters may include, for example, whether the aircraft is maneuvering, accelerating, decelerating, or some other suitable parameter.

Figure 14:
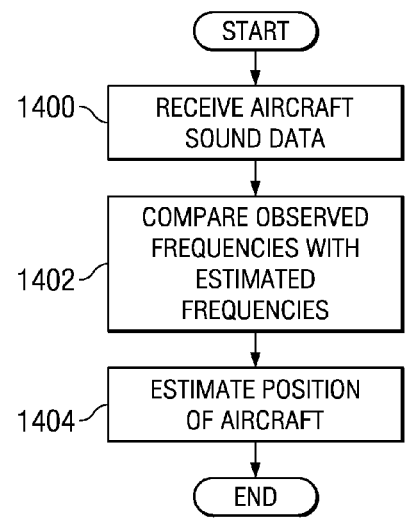
FIG. 14 is a flowchart of a process for estimating a position of an aircraft in accordance with an advantageous embodiment.

With reference now to FIG. 14, a flowchart of a process for estimating a position of an aircraft is depicted in accordance with an advantageous embodiment. The process illustrated in FIG. 14 may be implemented in a component, such as position estimation 514 in FIG. 5.

The process begins by receiving aircraft sound data (operation 1400). In these examples, the aircraft sound data includes frequency and amplitude of sound over time. This data also may include slant range and altitude at the closest point of approach.

The process compares the observed frequencies with the estimated frequencies (operation 1402). The process then estimates a position of the aircraft based on the comparisons (operation 1404), with the process terminating thereafter.

Figure 15:
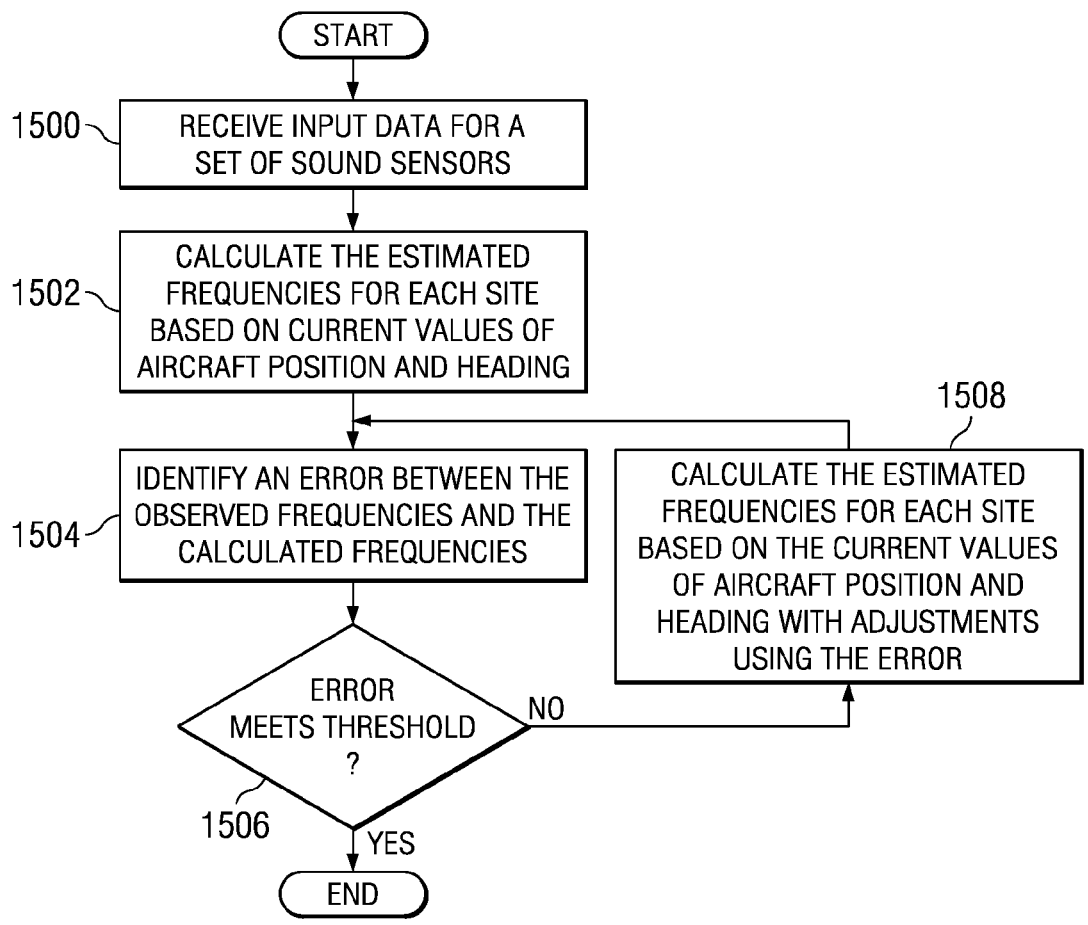
FIG. 15 is a flowchart of a process for identifying a position of an aircraft in accordance with an advantageous embodiment.

With reference now to FIG. 15, a flowchart of a process for identifying a position of an aircraft is depicted in accordance with an advantageous embodiment. The process illustrated in FIG. 15 is a more detailed illustration of the operations performed in FIG. 14.

The process begins by receiving input data for a set of sound sensors (operation 1500). This input data includes narrowband frequency tracker information from each of the sound sensors. Further, these inputs also include t=desired time for estimates of aircraft position and heading; xi=x position of i-th site, i=1, 2, 3; yi=y position of i-th site, i=1, 2, 3; c=sound speed in air; f0=estimated propeller (or exhaust) frequency; v=estimated aircraft speed; $x_{A\_init}$, $y_{A\_init}$=initial guess of aircraft position at time t; and $\phi_{init}$=initial guess of aircraft heading at time t. The process uses this initial data to calculate the estimated frequencies for each site based on the current values of aircraft position and heading (operation 1502).

This calculation may be made as follows:

$$f_{i\_est}(t) = f_0 + f_0\left(\frac{v}{c}\right)^2 \sin^2[\theta_i(t)] + f_0\frac{v}{c}\cos[\theta_i(t)]\left\{1 - \left(\frac{v}{c}\right)^2 \sin^2[\theta_i(t)]\right\}^{1/2}$$

where $$\theta_i(t) = \phi - \tan^{-1}\left(\frac{x_i - x_A}{y_i - y_A}\right) \quad i = 1, 2, 3$$

The process identifies an error between the observed frequencies and the calculated frequencies (operation 1504). This error may be calculated as follows:

$$Err = \sum_{i=1}^{3} [f_i(t) - f_{i\_est}(t)]^2$$

The process then determines whether the error meets a threshold level (operation 1506). This calculation in operation 1506 may continue until some error level is reached. This error level may be a value that is identified based on the geometry of the deployed sensors.

If the error does not meet the threshold, the process calculates the estimated frequencies for each site based on the current values of aircraft position and heading with the adjustments using the error (operation 1508). The process then returns to operation 1504 as described above. With reference again to operation 1506, if the error meets the threshold, the process terminates. At this point, the output is coordinates, such $x_A$, $y_A$, which identify the position of the aircraft at the desired time. Additionally, an estimated heading, $\phi$, also is output for the desired time.

In the example in FIG. 15, the different operations are illustrated using three sites containing sound sensors as examples. Of course, in other embodiments, other numbers of sites may be processed. For example, without limitation, the processing in these illustrative examples may be formed using sound sensors in 5, 10, or even 15 different sites.

Figure 16:
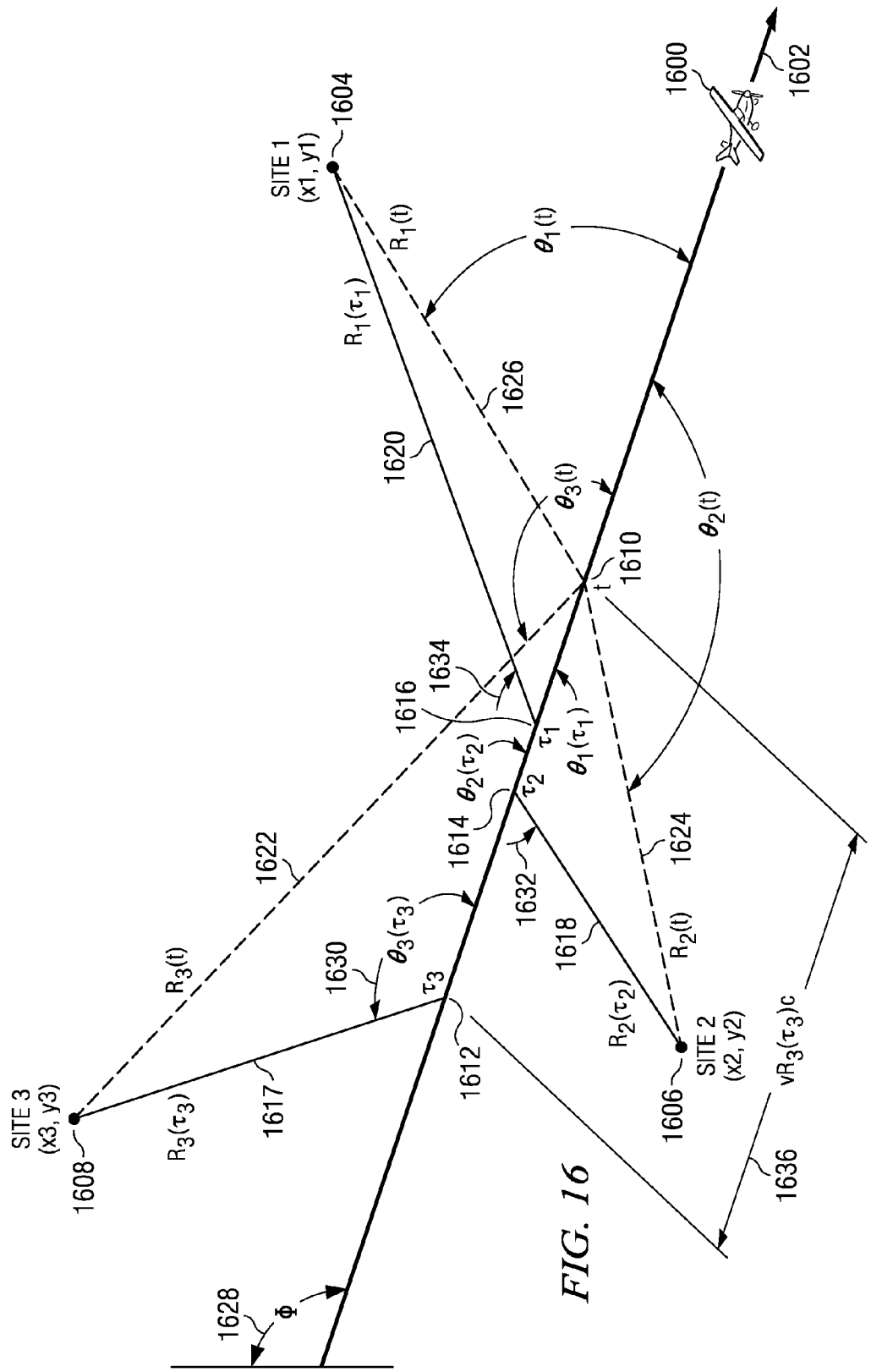
FIG. 16 is a diagram illustrating estimating an aircraft position in accordance with an advantageous embodiment.

With reference now to FIG. 16, a diagram illustrating estimating an aircraft position is depicted in accordance with an advantageous embodiment. In this example, the estimate of the position for aircraft 1600 traveling in the direction of line 1602 is performed using narrowband detections, in these advantageous embodiments. In other words, line 1602 represents the path of aircraft 1600.

The position of aircraft 1600 may be identified using the broadband frequencies of the acoustic emission. This type of position location uses time differences of arrival at different sound sensors. These time differences are typically estimated using cross-correlation. This type of process, however, may be unusable in many instances because of insufficient broadband energy detected in the aircraft emissions to produce discernable cross-correlation peaks needed to identify the position of the aircraft.

In this example, aircraft emissions generated by aircraft 1600 may be detected by sound sensor 1604 at site1, sound sensor 1606 at site2, and sound sensor 1608 at site3. In this example, the position of aircraft 1600 is desired for time t at point 1610. Points 1612, 1614, and 1616 represent the times that aircraft emissions must be generated by aircraft 1600 to arrive at sites 3, 2 and 1, respectively at time t (point 1610).

For example, point 1612 is the time at which an aircraft emission was generated by aircraft 1600 when sound sensor 1608 detects that emission at time t. Point 1614 represents the time at which aircraft 1600 generates a sound emission that is detected by sound sensor 1606 at time t. Point 1616 represents the time at which the sound emission was generated that is received by sound sensor 1604 at time t at point 1610. Lines 1616, 1618, and 1620 represent the range from a particular site to the aircraft at the time an emission was generated. This distance is also referred to as slant range.

Dotted lines 1622, 1624, and 1626 represents slant ranges from a particular site to the aircraft at time t. Angle 1628 represents the heading of aircraft 1600. Angles 1630, 1632, and 1634 represent an angle between the direction vector to the particular site and the aircraft heading at the time the acoustic emission was generated.

For example, angle 1630 represents the direction vector from the aircraft at point 1612 to sound sensor 1608. Distance 1636 represents the distance an aircraft travels from when the emission generated at point 1612 to the current time for which data is desired at point 1610.

In the different advantageous embodiments, the following may be derived from FIG. 16. The time interval $t-\tau_i$ is the time required for the signal to reach site i. That is $$t - \tau_i = \frac{R_i(\tau_i)}{c}$$

The following equations may be used to identify the position of the aircraft:

$$\theta_i(t) = \phi - \tan^{-1}\left(\frac{x_i - x_A}{y_i - y_A}\right) \quad (1)$$

$$f_i(\tau_i) = f_0 + f_0\left(\frac{v}{c}\right)^2 \sin^2[\theta_i(t)] + f_0 \frac{v}{c}\cos[\theta_i(t)]\left\{1 - \left(\frac{v}{c}\right)^2 \sin^2[\theta_i(t)]\right\}^{1/2} \quad (2)$$

where $\theta_i(t)$ is defined in (1).

The set of equations (2) is solved for the location and heading of the aircraft at time t by using a minimization algorithm such as the Nelder-Mead simplex (direct search) method.

In the different examples described above, the following notations are used: c=speed of sound; $f_i(\tau_i)$=Doppler shifted aircraft propeller blade frequency (or exhaust frequency) emitted at $\tau_i$ and measured at site i at time t; $f_0$=aircraft propeller blade frequency (or exhaust frequency); i=site index; $R_i(\tau_i)$=slant range from site i to aircraft at time $\tau_i$; $R_i(t)$=slant range from site i to aircraft at time t; t=(common) arrival time at site i of a tone emitted by the aircraft at time $\tau_i$; v=aircraft speed; $(x_A, y_A)$=position of the aircraft at time t; $(x_i, y_i)$=position of site i; $\phi$=aircraft heading; $\theta_i(t)$=angle between direction vector to site i and aircraft heading at time t; $\theta_i(\tau_i)$= angle between direction vector to site i and aircraft heading at time $\tau_i$; and $\tau_i$=emission time at the aircraft of a signal that arrives at site i at time t.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

In this manner, the different advantageous embodiments are capable of providing a system for detecting aircraft. This system may detect aircraft when other detection systems, such as radar systems, are unable to detect an aircraft. For example, an aircraft flying at a low enough altitude may not be detected by a conventional radar system.

Acoustic air surveillance system 100 in FIG. 1 may complement other detection systems to provide identification of these types of flying aircraft. The Doppler tracking technique, in the advantageous embodiments, may be enhanced through more advanced processing to determine the time difference of arrival of the acoustic emission at the various sensors.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for wide area tracking of an aircraft, the method comprising:
   detecting an acoustic emission of the aircraft from a plurality of locations;
   estimating a position of the aircraft at a set of times by comparing a set of harmonically related Doppler shifted frequencies for the acoustic emission to an expected zero Doppler shifted frequency of the aircraft, and comparing ratios of amplitudes of the acoustic emission from the plurality of locations, to form an estimated position; and
   tracking the position of the aircraft and a heading of the aircraft using the estimated position.

2. The method of claim 1 further comprising:
   determining an estimated velocity of the aircraft and an acoustic emission frequency at a zero-Doppler for at least one of the plurality of locations.

3. The method of claim 1, wherein the detecting step comprises:
   detecting the acoustic emission of the aircraft from at least three locations.

4. The method of claim 1, wherein the tracking step comprises:
   tracking the position of the aircraft position and the heading of the aircraft using the estimated position and a time-phased Doppler history.

5. The method of claim 1, wherein the detecting step comprises:
   detecting the acoustic emission of the aircraft from the plurality of locations using a plurality of omni-directional sound sensors at the plurality of locations.

6. The method of claim 1 further comprising:
   identifying a type of aircraft from the acoustic emission.

7. The method of claim 6, wherein the step of identifying the type of aircraft from the acoustic emission comprises:
   identifying a spectrum in the acoustic emission for propeller harmonics and engine exhaust harmonics to form an identified spectrum; and
   identifying the type of aircraft from the identified spectrum.

8. The method of claim 7, wherein the identifying step is performed each time a sound sensor at one of the plurality of locations detects the acoustic emission.

9. A method for monitoring an area for an aircraft, the method comprising:
   monitoring a plurality of sound sensors for an acoustic emission from the aircraft in the area;
   responsive to detecting the acoustic emission at a set of sound sensors within the plurality of sound sensors, comparing observed frequencies for the aircraft in the acoustic emission detected by the set of sounds sensors with a set of expected frequencies for the acoustic emission to form a comparison wherein the comparing further comprises comparing a set of harmonically related Doppler shifted frequencies from the acoustic emission as observed by the set of sound sensors to a set of expected zero Doppler shifted frequencies for the aircraft; and
   estimating a position of the aircraft from the comparison.

10. The method of claim 9 further comprising:
    responsive to detecting the acoustic emission from a sound sensor in the plurality of sounds sensors, identifying a set of changes in spectral components of the acoustic emission to form a set of identified changes;
    identifying a heading of the aircraft from the set of identified changes;
    identifying a Doppler shifted frequency signature from the acoustic emission to form an identified Doppler shifted frequency signature; and
    identifying a set of characteristics about the aircraft from the Doppler shifted frequency signature.

11. The method of claim 9 further comprising:
    identifying an unshifted Doppler frequency signature for the aircraft;
    identifying the set of characteristics about the aircraft from the unshifted Doppler frequency signature.

12. The method of claim 9, further comprising:
    responsive to detecting the acoustic emission at multiple sound sensors in the plurality of sound sensors, estimating a position of the aircraft from differences between the acoustic emissions detected at the multiple sound sensors.

13. The method of claim 12, wherein the estimating step comprises:
    responsive to detecting the acoustic emission at the multiple sound sensors in the plurality of sound sensors, estimating the position of the aircraft from the differences between frequencies and spectrum levels in the acoustic emission detected at the multiple sound sensors.

14. The method of claim 12, wherein the estimating step comprises:
    comparing a set of observed frequencies for the acoustic emission to a calculated set of frequencies for the acoustic emissions for the aircraft to form an estimated position.

15. An apparatus comprising:

a plurality of sound sensors capable of detecting an acoustic emission from an aircraft;

a data processing system in communication with the plurality of sound sensors, wherein the data processing system is capable of monitoring the plurality of sound sensors for the acoustic emission from the aircraft and estimating a position of the aircraft using sound data for the acoustic emission as detected by a set of sound sensors in the plurality of sound sensors in response to detecting the acoustic emission at the set of sound sensors, and tracking the position of the aircraft and a heading of the aircraft using the estimated position and a time-phased Doppler history.

16. The apparatus of claim 15, wherein the data processing system is capable of identifying a signature for the aircraft in a range of frequencies for the acoustic emission in response to detecting the acoustic emission at the set of sounds sensors and is capable of classifying the aircraft from the signature.

17. The apparatus of claim 15, wherein a particular sound sensor in the plurality of sound sensors detecting the acoustic emission is capable of identifying the signature for the aircraft in the range of the frequencies for the acoustic emission in response to detecting the acoustic emission.

18. The apparatus of claim 16, wherein the data processing system is capable of identifying the aircraft from the signature identified by the particular sound sensor.

19. The apparatus of claim 15, wherein the data processing system is capable of identifying a heading of the aircraft from the acoustic emission.

20. The apparatus of claim 15, wherein the plurality of sound sensors are a plurality of omni-directional microphones.

21. The method of claim 1 wherein the step of detecting an acoustic emission of an aircraft comprises detecting an acoustic emission of a fixed wing aircraft.

22. The method of claim 9 wherein the step of monitoring a plurality of sound sensors for an acoustic emission from the aircraft in the area comprises monitoring a plurality of sound sensors for an acoustic emission from a fixed wing aircraft in the area.

* * * * *